March 15, 1966  E. MÜLLER  3,240,004
APPARATUS FOR GATHERING APPLES AND LIKE FRUIT
Filed Aug. 26, 1964  2 Sheets-Sheet 1

INVENTOR
Edwin Müller

BY
ATTORNEYS

March 15, 1966   E. MÜLLER   3,240,004
APPARATUS FOR GATHERING APPLES AND LIKE FRUIT
Filed Aug. 26, 1964   2 Sheets-Sheet 2
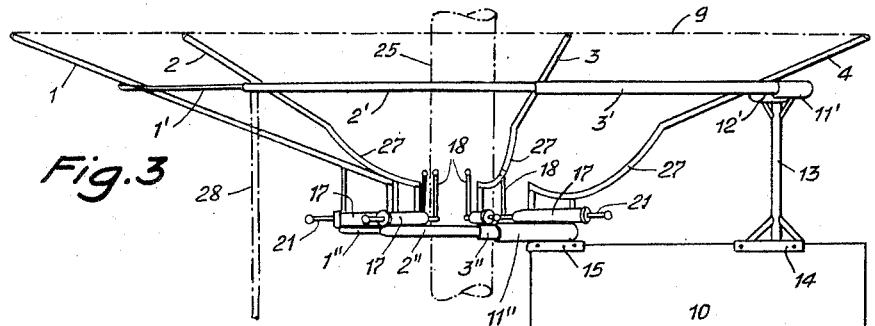
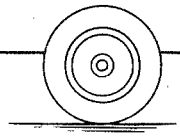
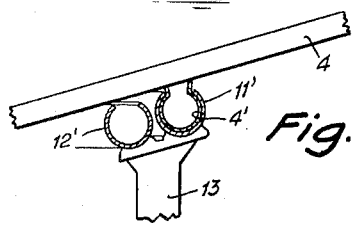
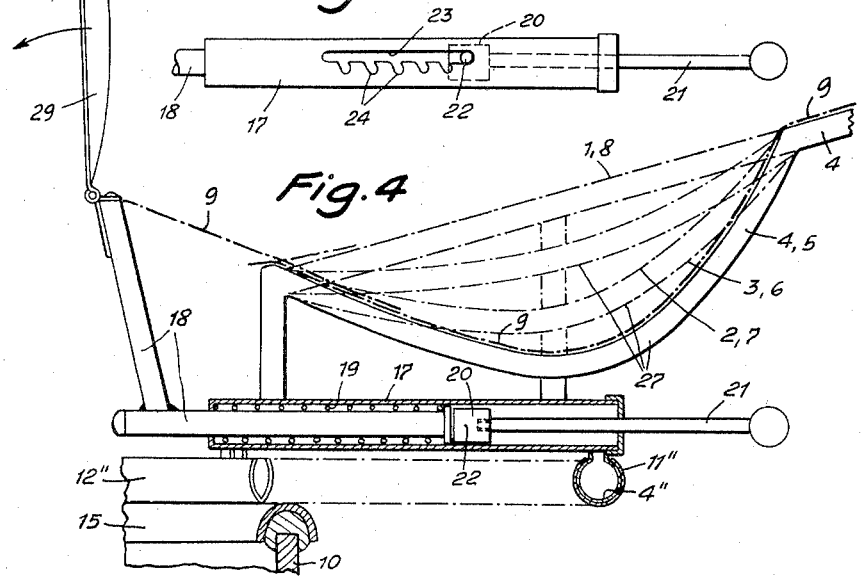
INVENTOR
EDWIN MÜLLER
BY Lowry & Rinehart
ATTORNEYS

United States Patent Office 3,240,004
Patented Mar. 15, 1966

3,240,004
APPARATUS FOR GATHERING APPLES
AND LIKE FRUIT
Edwin Müller, Ankerstrasse 12, Zurich, Switzerland
Filed Aug. 26, 1964, Ser. No. 392,164
7 Claims. (Cl. 56—329)

Apples, pears and like fruits which are to be pressed to form juice or cider are gathered by shaking the fruit from trees. The fruit is then picked up from the ground and collected in bags which have to be lifted on wagons, trucks, carts and similar vehicles and brought in from the fields. In this respect, the work of picking up the fruit from the ground is tiresome and time-consuming, while loading the filled sacks is heavy work that cannot be carried out by women. The present invention aims to facilitate, simplify and substantially shorten this work of gathering fruit.

The subject matter of the invention is a novel apparatus for gathering apples and like fruit in which the fruit is caught by a foldable or collapsible catch umbrella and is conducted directly from the umbrella into a transport cart or dolly which also serves as a carrier for the umbrella. The catch umbrella is unfolded substantially to twice the width of the dolly and is provided with an in-feed opening that leads the fruit into the dolly; and the umbrella forms a trough or hopper which is downwardly inclined towards the in-feed opening.

One form of the invention is shown in the drawings, in which:

FIG. 3 is a side elevational view of the apparatus, and additionally illustrates the relationship between the umbrella and the cart;

FIG. 4 is an enlarged sectional view taken generally along line IV—IV of FIG. 1 and illustrates an umbrella-rib adapter for adjusting the apparatus to compensate for varied tree-trunk diameters;

FIG. 5 is a fragmentary view of a portion of the adapter, and illustrates a mechanism for interlocking the adapter in a desired adjusted position thereof;

FIG. 6 is an enlarged cross-sectional view taken generally along line VI—VI of FIG. 1, and illustrates a sliding connector between the catch umbrella and a support attached to the cart;

FIG. 7 is an enlarged detail view of the connector of FIG 6, and illustrates a plurality of telescoped ring portions of the connection.

Figure 1:
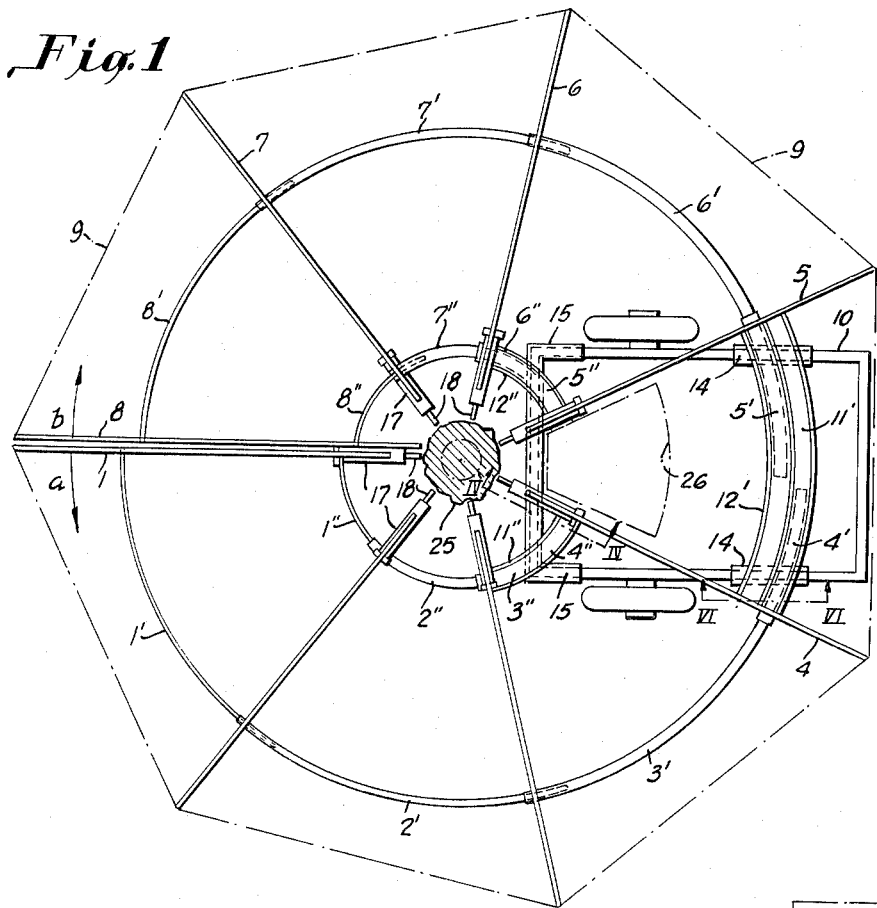
FIG. 1 is a top view of the apparatus, and illustrates a cart carrying an umbrella unfolded or spread out to enclose the trunk of a tree, the covering cloth of the umbrella being shown in phantom outline.
Figure 2:
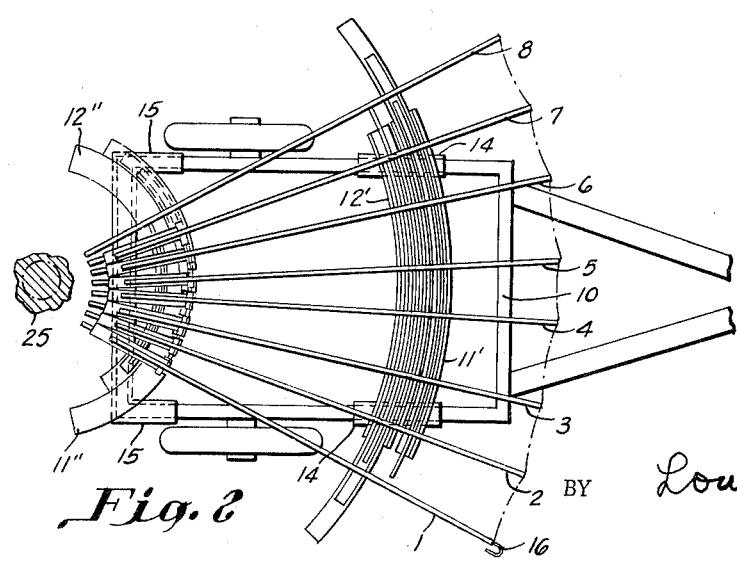
FIG. 2 is a top view of the folded umbrella.

The novel apparatus of this invention comprises a catch umbrella formed of eight ribs 1 to 8 and a covering cloth 9 made of canvas, or similar foldable material. The umbrella is supported by two carrying rings 1' to 8' and 1" to 8" which are carried by a transport cart 10 for receiving the fruit. The ring 1' to 8' has a larger diameter and is mounted above the ring 1" to 8". The two supportings rings are formed by two ring half-portions 1' to 4' and 5' to 8' on one hand and 1" to 4" and 5" to 8" on the other hand which are divided in the vertical longitudinal median plane of the cart and are staggered relative to each other in the longitudinal direction of the cart. The two supporting rings are formed of telescopic tubular ring segments 1' to 8' and 1" to 8" respectively that are provided with longitudinally extending grooves which open upwardly, as is best illustrated in FIGS. 1 and 2 of the drawings. Each tubular segment 1' to 8' and 1" to 8" is connected to an associated one of a plurality of umbrella ribs 1 to 8. The tubular segments 1' and 1" are each connected to the umbrella rib 1, the tubular segments 2' and 2" are each connected to the umbrella rib 2, etc. The supporting-ring segments 4', 5' of the exterior ring and 4", 5" of the interior ring which have the largest tube diameter are guided in stationary guide-tube ring segments 11', 12' and 11", 12" respectively, which are provided with longitudinal, upwardly opening grooves and are detachably mounted on the cart 10. The ring segments 11', 12' are detachably secured to the cart 10 by means of short vertical pipe lengths 13 with feet 14 (FIGS. 3, 6) while the ring segments 11", 12" of the inner, lower carrying ring are detachably secured to the cart 10 by a foot 15. The covering cloth 9 is connected to the outer ends of the ribs 1 to 8 as well as to various other portions of the ribs spaced from the umbrella center. The covering cloth 9 is folded when the umbrella is collapsed by pivoting the ribs in the direction of the arrows $a, b$ in FIG. 1. When the umbrella is unfolded or spread out the ribs 1 and 8 contact each other and are interconnectable by a fork-member 16 (FIG. 2) which is radially movable on the exterior end portion of the rib 1. The interior end-portions of the ribs 1 to 7 are connected to guide tubes 17 carried by the ring segments 1" to 7". Each of the guide tubes 17 has a rib extension 18 guidably and telescopically housed by an associated one of the tubes 17. The rib extension 18 terminates in upwardly directed end portions (unnumbered). The rib extensions 18 are radially adjustable and are connected at their outer end portions to the interior edge of the covering cloth 9. The rib extensions 18 are movable in the guide tubes 17 and are adjustable as desired towards the umbrella center against the action of a compression spring 19. The rib extensions 18 are adjusted by moving a piston rod 21 provided with a piston 20 guided in the respective tubes 17. Each rib extension 18 is fixed in a desired position of adjustment by a detent 22 carried by each piston 20 slidable in a longitudinal slot 23 having notches 24 in each guide tube 17, in the manner readily apparent from FIG. 5. As the rib extensions 18 are adjusted the interior edge of the covering cloth 9 is snugly fitted to various thicknesses of trees, such as the tree 25 (FIGS. 1 and 3). The umbrella center is situated to the rear and outside of the cart 10 (FIG. 1). In the vicinity of the umbrella center the covering cloth 9 has a loading aperture 26 between the ribs 4 and 5, which is situated at the lowermost point of the trough formed by the umbrella and above the cart 10. The slope required for leading the fruit into the opening 26 is effected by deflecting the ribs 1–8 downwardly in varied degrees, as is best illustrated in FIG. 4 of the drawing, noting the curvature of the portions 27 of each of the ribs 1–8.

When the umbrella is in its collapsed state, the apparatus may be wheeled up to any small or medium size tree 25 (FIG. 2) so that the umbrella ribs 1–8 point towards the center of the tree trunk. In this position the umbrella is opened by spreading the ribs until the covering cloth 9 is stretched taut. As soon as the ribs 1, 8 abut against each other they are interconnected by the forked member 16 that is radially movable on the exterior end of the rib 1. The connection of the inner edge of covering cloth 9 to the tree 25 is effected by pushing the piston rods 21 inwardly and turning the same to lock the detents 22 in the notches 24 of the tubes 17. In the case of trees heavily laden with fruit, the umbrella may be braced on the side adjacent the cart 10. For this purpose the carrying-ring segments 2' and 7' are capable of being braced at their point of intersection with the ribs 2 and 7 by supports 28 (FIG. 3). When using the apparatus on big trees, the umbrella may be set up outside of the tree trunk instead of concentrically therewith, so that the circumferential line of the umbrella contacts the tree trunk. In such case the umbrella opening has to be diminished by pushing home the piston rods 21 closing a fold down flap 29 (FIG. 4) that is pivoted to the end of one of the rib extensions 18.

When shaking the tree branches, the apples or pears or other fruit fall into the umbrella and roll towards the outlet opening 26 situated at the lowermost point and through the same into the cart 10. When the cart 10 is full the umbrella is folded, as shown in FIG. 2, and the crop is wheeled away.

Figure 8:
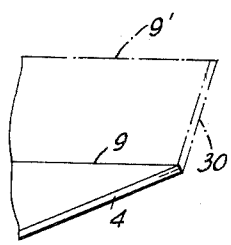
FIG 8 is a fragmentary view of the umbrella, and illustrates a removable collar, in phantom outline, attached to the umbrella.

The apparatus may also be used for gathering leaves, in which case the umbrella is supplemented by a collar 9' (FIG. 8) that is provided with plug-in stays 30. The leaves remain in the open umbrella when being wheeled away.

While the invention has been described in detail with respect to a now preferred example and embodiment of the invention it will be understood by those skilled in the art after understanding the invention, that various changes and modifications may be made without departing from the spirit and scope of the invention and it is intended, therefore, to cover all such changes and modifications in the appended claims.

Having thus described my invention, I claim as new and desire to secure by Letters Patent:

1. A device for gathering apples, pears and like fruit comprising a supporting member, a first arcuate frame secured to said supporting member, a second arcuate frame secured to said supporting member and located above said first arcuate frame, each of said frames comprising at least two substantially horizontally disposed sections, said sections of each of said frames being provided with means for telescoping one of said sections substantially entirely within the other of said sections, a plurality of rib means connected between each of said frames, and a flexible fruit receiving means supported by said rib means.

2. A device for gathering apples, pears and like fruit comprising a supporting member, a first arcuate frame secured to said supporting member, a second arcuate frame secured to said supporting member and located above said first arcuate frame, each of said frames comprising at least two substantially horizontally disposed sections, said sections of each of said frames being provided with means for telescoping one of said sections substantially entirely within the other of said sections, a plurality of rib means connected between each of said frames, a flexible fruit receiving means supported by said rib means, said first arcuate frame section normally defining an opening adapted to surround a tree trunk during the operation of the device, and means for adjusting the size of said opening for accommodating tree trunks of varied sizes.

3. A device for gathering apples, pears and like fruit comprising a supporting member, a first arcuate frame secured to said supporting member, a second arcuate frame secured to said supporting member and located above said first arcuate frame, each of said frames comprising at least two substantially horizontally disposed sections, said sections of each of said frames being provided with means for telescoping one of said sections substantially entirely within the other of said sections, a plurality of rib means connected between each of said frames, a flexible fruit receiving means supported by said rib means, said first arcuate frame section normally defining an opening adapted to surround a tree trunk during the operation of the device, a plurality of tubular members carried by said first arcuate frame section and positioned in radial relationship to said opening, and a member guidably received in each tubular member adapted for movement toward and away from a tree trunk for accommodating tree trunks of varied sizes.

4. The device as defined in claim 3 including means for positively securing the tubular members and the members received therein in a plurality of relative positions of adjustment therebetween.

5. A device for gathering apples, pears and like fruit comprising a supporting member, a first arcuate frame secured to said supporting member, a second arcuate frame secured to said supporting member and located above said first arcuate frame, each of said frames comprising at least two substantially horizontally disposed sections, said sections of each of said frames being provided with means for telescoping one of said sections substantially entirely within the other of said sections, a plurality of rib means connected between each of said frames, a flexible fruit receiving means supported by said rib means, a plurality of said rib means having upwardly opening concave end portions adjacent said first arcuate supporting frame, and said end portions being of diverse curvatures to define a trough leading to an opening in said flexible fruit receiving means.

6. A device for gathering apples, pears and like fruit comprising a supporting member, a first arcuate frame secured to said supporting member, a second arcuate frame secured to said supporting member and located above said first arcuate frame, each of said frames comprising at least two substantially horizontally disposed sections, said sections of each of said frames being provided with means for telescoping one of said sections substantially entirely within the other of said sections, a plurality of rib means connected between each of said frames, a flexible fruit receiving means supported by said rib means, said flexible fruit receiving means being of predetermined size, and means removably secured to a periphery of said flexible fruit receiving means for increasing the predetermined size thereof.

7. A device for gathering apples, pears and the like comprising a supporting member, a first arcuate frame secured to said supporting member, a second arcuate frame secured to said supporting member and located above said first arcuate frame, each of said frames comprising at least two substantially horizontally disposed sections, said sections of each of said frames being provided with means for telescoping one of said sections substantially entirely within the other of said sections, a plurality of rib means connected between each of said frames, a flexible fruit receiving means supported by said rib means, said device including adjusting means for accommodating tree trunks of varied diameters, means for adjustably securing said accommodating means in selected positions of adjustment, means defining a trough-shaped portion in said flexible fruit receiving means, and an opening in said trough-shaped portion.

References Cited by the Examiner

UNITED STATES PATENTS

| | | | |
|---|---|---|---|
| 136,072 | 2/1873 | Kisor | 56—329 |
| 492,952 | 7/1893 | Ball | 56—329 |
| 775,248 | 11/1904 | Reid | 56—329 |
| 1,132,325 | 3/1915 | Fountain et al. | 56—329 |
| 1,286,947 | 12/1918 | Creed | 56—329 |
| 1,366,563 | 1/1921 | Fleckner | 56—329 |
| 1,520,129 | 12/1924 | Hedeen | 56—329 |
| 3,105,346 | 10/1963 | Stanclift | 56—329 |

FOREIGN PATENTS 577,364  5/1958  Italy.

ABRAHAM G. STONE, Primary Examiner.

RUSSELL R. KINSEY, Examiner.

MICHAEL C. PAYDEN, Assistant Examiner.